Oct. 28, 1930.  H. E. NORVIEL  1,779,446
SWITCH
Filed Nov. 29, 1929
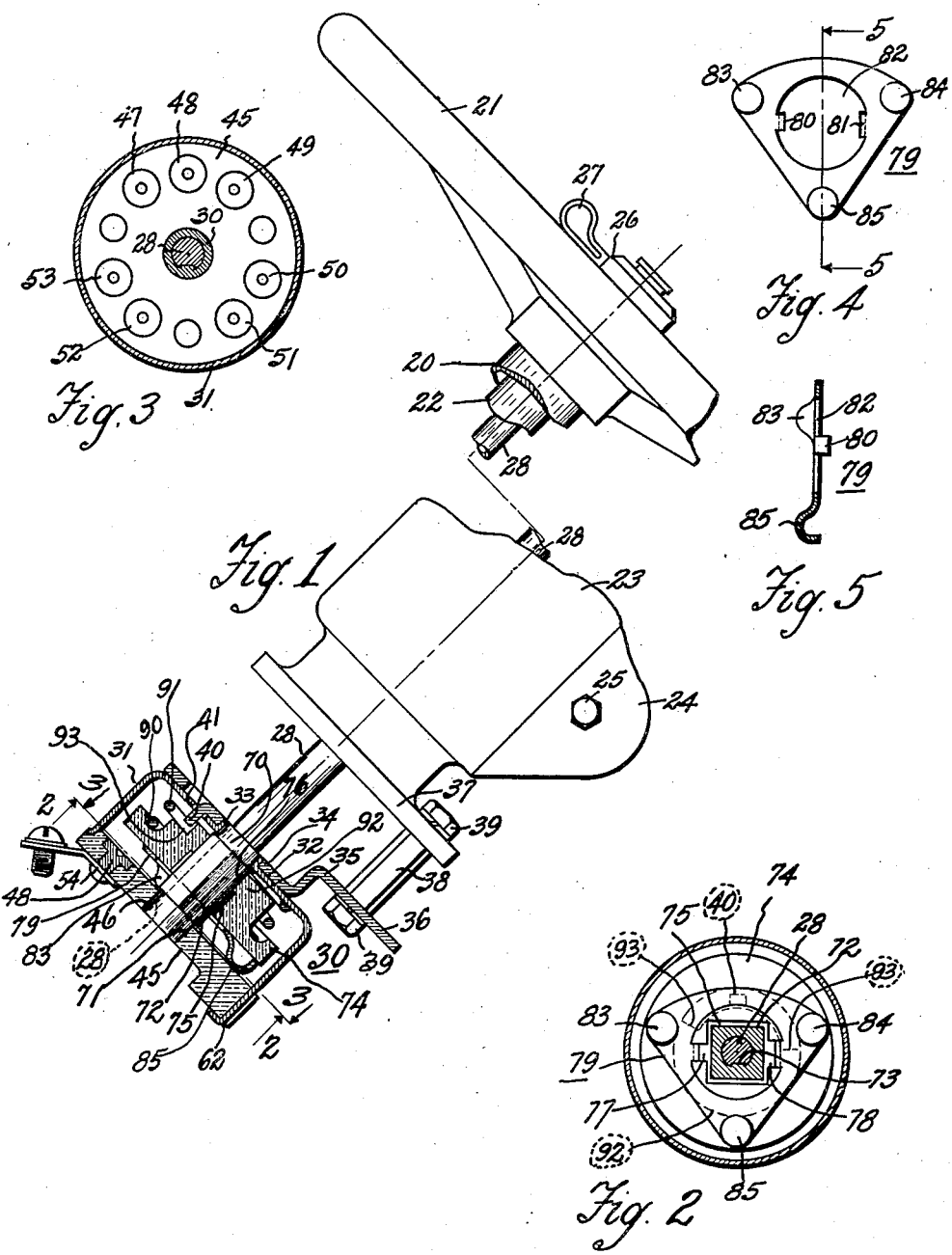
Inventor
Harry E. Norviel
By Spencer Hardman & Fehr
his Attorneys Patented Oct. 28, 1930

1,779,446

UNITED STATES PATENT OFFICE

HARRY E. NORVIEL, OF ANDERSON, INDIANA, ASSIGNOR TO DELCO-REMY CORPORATION, OF ANDERSON, INDIANA, A CORPORATION OF DELAWARE

SWITCH

Application filed November 29, 1929. Serial No. 410,462.

This invention pertains to electric switches adaptable for mounting upon and controlled through the steering post of an automotive vehicle.

One of the objects of the instant invention is to provide a switch structure that is capable of construction at a low cost that will be efficient and certain in its operation and that will mark for improvement for switches in general.

Further objects and advantages of the present invention will be apparent from the following description, reference being had to the accompanying drawings wherein a preferred embodiment of one form of the present invention is clearly shown.

In the drawings:

Fig. 1 is an elevational view of a steering post and wheel attached thereto and showing in vertical section my improved switch device operably connected with a controller carried by said post.

Fig. 2 is rear view of the contact support assembly substantially as indicated by the line and arrows 2—2 of Fig. 1.

Fig. 3 is a cross section through the switch device, illustrating a switch back in plan substantially as indicated by the line and arrows 3—3 of Fig. 1.

Figs. 4 and 5 are detailed views, being a plan and section view respectively of a movable contact plate, Fig. 5 being a section substantially as indicated by the line and arrows 5—5 of Fig. 4.

With particular reference to the drawings, 20 indicates a steering post provided with a steering wheel 21, designed to control a concentric tube 22, which may terminate in the gear casing 23 at the lower end of the post, for purposes of controlling the steering of the vehicle, the gear casing being secured to the frame by a mounting lug 24 with a bolt and nut device 25. At the hub of the wheel 21 may be provided a rotor 26 having a handle 27 and secured to an actuating rod 28, concentrically disposed within the tubes 20 and 22 and projecting through the gear housing 23 so as to make driving engagement with a switch structure 30 for the purpose of actuating the same.

The immediate switch structure comprises a housing 31 of cup formation having a bottom 32 coaxially punched and flanged as at 33 providing a sleeve like member for reception in an apertured leg 34 of an attaching bracket 35, a second leg 36 of which is fixed to an attaching flange 37 of the gear casing 33 by means of a spacing stud 38 and nuts 39. The bracket 35 may be secured to the housing 31 in any preferred manner. It is to include the laterally directed squirt 40 projecting into the housing 31 through an aperture 41 located in the bottom 32 to one side of the central aperture receiving the sleeve 33.

The housing 31 is provided with a switch back 45 which, when assembled therewith provides a pair of substantially parallel walls on opposed sides of the housing, and when the switch back is centrally apertured as at 46 provides aligned apertures for reception of the control member 28. The switch back 45 is of dielectric material and moldably secures a plurality of fixed contact members 47, 48, 49, 50, 51, 52, and 53 each of which may have provision of terminal lugs 54, the switch back having a one-way mating relation with the housing 31 by means of the peripheral tangs 62, of the housing 31 seating within notches 66, of the said switch back. The aligned apertures provided by the sleeve 33 in the bottom of the cup 31 and the aperture 46 in the switch back 45 provide bearings for the trunnions 70 and 71 of a square shaft 72, which is drivingly engaged by the shaft 28, as by the feather 73 of the shaft engaging a slot in the end of the rod 28.

While the shaft 72 is herein shown as being square in cross section it may be hexagonal or octagonal or of any other non-rounded formation by which driving engagement may be provided between it and the dielectric driving member 74. In the present instance the member 74 is formed of molded insulating material and is formed to provide a central square aperture closely mating with the cross section of the shaft 72 so as to provide a driving engagement therewith. This central aperture is provided with a counter-sink 75 about the shaft 72 so as to reduce the portion of the engaging surfaces between the shaft 72 and the member 74 to a minimum amount of engaged surface as indicated at 76 in Fig. 1. The member 74 is also molded to include the recesses 77 and 78 which may be radial extensions of the counter-sink 75 as illustrated in Fig. 2, but in all events are of differing size so as to provide a one-way mating relation with the movable contact plate 79 through the tangs 80 and 81 respectively. That is, the contact member 79 when disposed against the driving member 74 will rest with the extensions 80 and 81 within the recesses 77 and 78 of the member 74 respectively and thus providing a driving engagement between the dielectric member and the movable contact. The contact plate 79 is centrally apertured at 82 for disposition about the shaft 72 in order to insure clearance or prevent contacting engagement between the said shaft and contact member, and concentrically arranged about this aperture there is provided the contact points 83, 84 and 85 which are adapted for cooperation with the fixed contacts of the switch back 45 hereinbefore referred to.

In addition to the above appointments the dielectric member 74 is molded or otherwise formed to include the annular surface groove 90 for seating of a spring 91 disposed against the bottom of the housing 32 and adapted to urge the contact carrying assembly into engagement with the switch back axially of the shaft 72 as will presently appear. Concentric with this groove 90 and within the area defined thereby the dielectric member includes a hub portion 92 which is arcuately notched at 93 for cooperation with the bracket extension 40 and designed to form limits of rotation of the dielectric member and shaft 72.

In the assembled form the switch structure is that illustrated in Fig. 1, in which the dielectric member 74 and movable contact 79 and shaft 72 with the spring 91 form a contact actuator assembly in which the dielectric member is rotated with and longitudinally movable relative to the shaft 72 so that the contact member 79 may move over the surface of the switch back to the points 83, 84 and 85 coming into and out of engagement with various ones of the fixed contacts 47 and 53 inclusive. The squirt 41 of the case and the arcuate notch 93 form cooperating provisions whereby rotation of the dielectric member 74 and shaft 72 is limited. The spring 91 disposed between the housing and the dielectric member urges the same along the axis of the shaft 72 against the switch back 45, yet is sufficiently yieldable to allow the contact points of the member 79 to pass over any qualities of surface with which they may come into engagement. The minimized surface engagement between the dielectric member and the shaft 72 reduces the frictional engagement between these members and thus assures positive following of the contact plate relative of the surface of the switch back. The cooperating stop provisions, that is the projection 41 of the bracket 35 within the housing 31 into the arcuate recess 93 are of sufficient extent to provide stops for the angular movement of the drive member 74 and shaft 72 irrespective of the axial position of the drive member 74 relative to the shaft 72.

It is obvious from the illustrated structure that manipulation of the control 26, 27 will operate to the rod 28 and the driving connection with the shaft 72 to actuate the contact member 79 to various positions of the surface of the switch back 45, and will thus operate to control the circuits through the fixed contacts 47 to 53 inclusive with which the member 79 may come into contact.

While the form of embodiment of the present invention as herein disclosed, constitutes a preferred form, it is to be understood that other forms might be adopted, all coming within the scope of the claims which follow.

What is claimed is as follows:

1. In an electric switch, the combination comprising, a housing, a bracket supported in the housing and providing a squirt projecting into the same, a switch back closing the housing, a shaft having journals in the switch back and housing, and providing a driving engagement with a drive plate, said drive plate having limited rotation within the housing due to interfitting engagement with said projecting squirt.

2. In an electric switch the combination comprising, a cup shaped housing having an attaching bracket secured to the bottom thereof, said bracket providing a squirt projecting into the housing, a contact actuating device within the housing having cooperating provisions for rotation therewithin as defined by said squirt.

3. In an electric switch the combination comprising, a cup shaped housing having a switch back, a shaft journalled in said switch back and housing, a contact support drivingly engaged by said shaft, and a bracket secured to said housing providing a lug projecting into the housing, said contact support having cooperative provision engageable with said lug for limiting the rotation of said contact support and shaft.

4. In an electric switch the combination comprising, a casing and switch back providing parallel walls, a non-rounded shaft having trunnions received by the said parallel walls, a contact carrying member fitting the nonrounded portion of said shaft and disposed for axial movement therealong, a bracket supporting the case and having provisions engaging said contact carrier for limiting rotation thereof.

5. In an electric switch the combination comprising, a switch back and housing providing parallel walls, a shaft trunnioned in said walls, a driving member supported by said shaft in nonrotatable relation therewith, said driving member supporting a movable contact engageable with said switch back, means urging said contact into engagement with said switch back and tending to urge the driving member axially of said shaft, said casing supporting provisions for limiting the rotation of said driving member within the same.

6. In a switch, the combination comprising, a casing and switch back providing parallel walls, a hollow shaft being non-rounded in cross section and having trunnions in said parallel walls, contact actuating means loosely engaged by the non-rounded portion of said shaft whereby driving engagement is provided therebetween, a bracket secured to said housing and providing means projecting within the same for limiting the rotation of said contact actuating means.

7. A switch of the class described comprising a housing and a switch back, contact actuating means within the housing supported for rotation relative thereto, a bracket secured to the housing for supporting the same and having a portion projecting within the housing engageable with the contact actuating means for limiting rotation thereof.

8. In an electric switch the combination comprising, a switch back and housing providing parallel walls, a shaft trunnioned in said walls, a driving member supported by said shaft for rotation therewith and supporting a contact member engageable with said switch back, a bracket secured to the housing and having provisions projecting into the housing for engaging a portion of the driving member whereby said driving member is capable of limited rotation, means engaging the housing and driving member urging the same in an axial direction of the shaft irrespective of the cooperating provisions of said member and bracket projections.

9. In an electric switch the combination comprising, a switch back and housing providing parallel walls, a shaft trunnioned in said walls, a driving member of dielectric material supported by said shaft and capable of longitudinal movement thereon, means engaging said driving member urging the same along the axis of said shaft to maintain said member in engagement with said switch back, a bracket supporting the housing and providing means within the housing limiting the angular movement of said driving member irrespective of the axial movement with respect to said shaft, means for oscillating said shaft and means providing a driving engagement between said shaft and said driving member.

10. In an electric switch the combination comprising, a switch back and housing providing parallel walls, a shaft trunnioned in said walls, a driving member supported by said shaft and carrying a movable contact member in cooperable engagement with contacts on said switch back, said driving member being longitudinally movable along said shaft for following the irregularities of said switch back and means engaging said driving member urging the same axially of said shaft and maintaining the same in engagement with said switch back, said driving member limited in its rotation by means projecting into said casing.

11. In an electric switch the combination comprising, a switch back and housing providing parallel walls, a shaft trurnioned in said walls, a dielectric driving member supported for rotation with said shaft and supporting a movable contact member, said shaft and dielectric member having cooperating driving provisions whereby said dielectric member will be rotated upon rotation of said shaft, said dielectric member having a countersink about said shaft for minimizing the frictional engagement of rectangular motion of one relative to the other, and means engaging said dielectric member urging the same along the axis of said shaft.

12. In an electric switch the combination comprising, a switch back and housing providing opposed walls, a square shaft having trunnions rotatably supported in said opposed walls, a dielectric driving member having a centrally located squared aperture for driving engagement upon said shaft, said dielectric member being counter-sunk about said opening to reduce the contact engagement between said member and shaft to a minimum, whereby longitudinal movement of the member relative to said shaft will be minimized, and means engaging the housing and dielectric member urging the same axially of said shaft.

13. In an electric switch the combination comprising, a switch back and housing providing opposed walls, a square shaft having trunnions rotatably supported in said opposed walls, a dielectric driving member having a centrally located squared aperture for driving engagement upon said shaft, said dielectric member being counter-sunk about said opening to reduce the contact engagement between said member and shaft to a minimum, whereby longitudinal movement of the member relative to said shaft will be minimized, and means engaging the housing and dielectric member urging the same axially of said shaft, said dielectric member supporting a movable contact in optionally engageable relation with terminals upon said switch back.

14. In an electric switch the combination comprising, a switch back and housing providing opposed walls, a square shaft having trunnions rotatably supported in said opposed walls, a dielectric driving member having a centrally located squared aperture for driving engagement upon said shaft, said dielectric member being counter-sunk about said opening to reduce the contact engagement between said member and shaft to a minimum, whereby longitudinal movement of the member relative to said shaft will be minimized, and means engaging the housing and dielectric member urging the same axially of said shaft, a bracket supporting said housing and providing means engageable with a portion of said dielectric member for limiting rotation thereof, irrespective of the axial position of said member relative to said shaft.

15. In an electric switch the combination comprising, a switch back and housing providing opposed walls, a square shaft having trunnions rotatably supported in said opposed walls, a dielectric driving member having a centrally located squared aperture for driving engagement upon said shaft, said dielectric member being countersunk about said opening to reduce the contact engagement between said member and shaft to a minimum, whereby longitudinal movement of the member relative to said shaft will be minimized, and means engaging the housing and dielectric member urging the same axially of said shaft, said dielectric member supporting a movable contact in optionally engageable relation with terminals upon said switch back, a bracket supporting said housing and providing means engageable with a portion of said dielectric member for limiting rotation thereof, irrespective of the axial position of said member relative to said shaft.

16. In a switch of the class described, the combination comprising, a case and switch back providing opposing walls, said opposing walls being apertured to provide aligned bearings, a squared hollow shaft providing trunnions for reception in said apertures, a dielectric driving member supporting a movable contact plate having driving engagement with said shaft, means disposed between the housing and driving member concentrically disposed with respect with said shaft urging the driving member and contact plate along said shaft and into engagement with said shaft, said driving member having a countersink about said shaft for minimizing the engaging portions of said member and shaft, whereby said dielectric member and contact plate may move axially of said shaft for following the irregularities of said switch back, and a bracket supporting said casing having provisions extending within the same for limiting the rotation of said dielectric member, irrespective of the axial position of said driving member relative to said shaft.

In testimony whereof I hereto affix my signature.

HARRY E. NORVIEL.